US012422111B1

(12) United States Patent
Chen

(10) Patent No.: US 12,422,111 B1
(45) Date of Patent: Sep. 23, 2025

(54) LIGHT STRING WITH REPLACEABLE DECORATIVE COVERS

(71) Applicant: Guangdong Lianrun Intelligent Technology Co., Ltd., Guangdong (CN)

(72) Inventor: Kunpeng Chen, Jiujiang (CN)

(73) Assignee: Guangdong Lianrun Intelligent Technology Co, Huizhou (CN)

( * ) Notice: Subject to any disclaimer, the term of this patent is extended or adjusted under 35 U.S.C. 154(b) by 0 days.

(21) Appl. No.: 18/822,183

(22) Filed: Aug. 31, 2024

(51) Int. Cl.

| | |
|---|---|
| ***F21S 4/10*** | (2016.01) |
| ***F21V 3/02*** | (2006.01) |
| ***F21V 17/00*** | (2006.01) |
| ***F21V 17/06*** | (2006.01) |

(52) U.S. Cl.
CPC .................................... *F21S 4/10* (2016.01); *F21V 3/02* (2013.01); *F21V 17/002* (2013.01); *F21V 17/06* (2013.01)

(58) Field of Classification Search
CPC .......... F21S 4/10; F21V 17/002; F21V 17/06; F21V 17/04
See application file for complete search history.

(56) References Cited

U.S. PATENT DOCUMENTS

| | | | | |
|---|---|---|---|---|
| 6,382,812 | B1 * | 5/2002 | Hsu | F21S 4/10 439/699.1 |
| 10,047,913 | B1 * | 8/2018 | Hsu | H01K 1/34 |
| 11,384,907 | B1 * | 7/2022 | Zou | F21V 21/002 |
| 2009/0273289 | A1 * | 11/2009 | Sun | F21V 31/00 315/185 S |
| 2010/0135024 | A1 * | 6/2010 | Gier | F21S 4/10 362/294 |
| 2010/0328953 | A1 * | 12/2010 | Wu | F21S 4/10 362/249.14 |
| 2015/0016113 | A1 * | 1/2015 | Kazemir | F21K 9/20 362/249.14 |
| 2023/0143898 | A1 * | 5/2023 | Xu | F21S 4/10 362/217.14 |

* cited by examiner

*Primary Examiner* — William N Harris
(74) *Attorney, Agent, or Firm* — Justin Lampel

(57) ABSTRACT

Disclosed is a light string with replaceable decorative covers, which relates to the technical field of light strings. The decorative light string includes multiple decorative lights, and each of the decorative lights includes a lamp base, a light emitting unit, a lamp shade, a lamp holder, and the decorative cover, where the decorative cover can be detachably mounted on the lamp shade, which allows the decorative cover to be located on a luminous side of the light emitting unit and thus makes it fully illuminated when the light emitting unit emits light. The light string has the advantages of being simple in structure, convenient and fast to disassemble and assemble, and good in decorative effect.

2 Claims, 11 Drawing Sheets

LIGHT STRING WITH REPLACEABLE DECORATIVE COVERS

TECHNICAL FIELD

The present disclosure relates to the technical field of light strings, and in particular to a light string with replaceable decorative covers.

BACKGROUND

With the continuous improvement of people's living standards, in different usage requirements and scenarios, it is required to have a light string that meets the usage requirements and matches the usage scenarios as an ambient or landscape lamp, to enhance the atmosphere or enrich beauty. It is an indispensable lighting fixture for decoration and is widely used in parks, squares, residential areas, streets, courtyards, and other places. The conventional light strings, according to different holiday scenes, often require decorative covers with corresponding shapes, such as a skull-shaped decorative cover, a pineapple-shaped decorative cover, a pentagram-shaped decorative cover, and a pumpkin-shaped decorative cover.

In order to solve the above problems, in the existing light string, decorative covers are designed to be detachably connected to lamp holders. In this way, although the decorative covers can be replaced rapidly, the connection of the decorative covers to the lamp holders will cause some of the decorative covers to be located on a non-luminous side of a light emitting unit. As a result, some parts of the decorative covers are not being illuminated by the light generated by the light emitting unit, and consequently, the decorative effect of the light string is affected.

SUMMARY

The purpose of the present disclosure is to provide a light string with replaceable decorative covers in view of the deficiencies and shortcomings of the prior art. The decorative covers are detachably mounted on lamp shades, which allows the decorative covers to be located on luminous sides of light emitting units and thus makes them fully illuminated when the light emitting units emit light. The light string has the advantages of being simple in structure, convenient and fast to disassemble and assemble, and good in decorative effect.

To achieve the above objectives, the technical solution adopted by the present disclosure is as follows: a light string with replaceable decorative covers includes multiple spliceable decorative lights; each of the decorative lights includes: a lamp base; a light emitting unit, connected to the lamp base, the light emitting unit being configured to emit light when powered on; a lamp shade, connected to the lamp base, the lamp shade being covered outside the light emitting unit; a lamp holder, assembled with the lamp base, the lamp holder being configured to connect the adjacent decorative lights and achieve a connection with an external power supply; and the decorative cover, detachably assembled with the lamp shade, the decorative cover having an accommodating cavity, and the lamp shade being accommodated inside the accommodating cavity.

In one of the embodiments, a clamping portion is provided on an outer side wall of each of the lamp shades in a protruding manner, and a clamping slot is formed in an inner wall of the corresponding accommodating cavity on a side close to the clamping portion; and/or, a clamping slot is formed in an outer side wall of each of the lamp shades, and a clamping portion is provided on an inner wall of the corresponding accommodating cavity on a side close to the clamping slot in a protruding manner; and the clamping slots adapt to the clamping portions, allowing the lamp shades to be detachably assembled with the decorative covers.

In one of the embodiments, the clamping portions are provided on the outer side walls of the lamp shades, the clamping slots are formed in the inner walls of the accommodating cavities, and an interstice is reserved between each of the clamping portions and the corresponding lamp base, so that each of the decorative covers and the corresponding lamp base are spaced apart.

In one of the embodiments, a mounting groove is formed on a side of each of the lamp bases close to the corresponding lamp shade, an assembly portion is provided on a side of the lamp shade close to the lamp base, and the assembly portion is inserted into the mounting groove and connected to the lamp base; a limit bulge is provided in a protruding manner at a position where the assembly portion is connected to the lamp shade; and an interstice is reserved between the limit bulge and the clamping portion, so that the decorative cover and the lamp base are spaced apart after assembly.

In one of the embodiments, each of the decorative covers includes a first cover body and a second cover body, the first cover body and the second cover body being detachably assembled.

In one of the embodiments, an insertion portion is provided on the first cover body in a protruding manner, and an insertion slot is formed in an end face of the second cover body on a side close to the first cover body; and/or, an insertion slot is formed in the first cover body, and an insertion portion is provided on an end face of the second cover body on a side close to the first cover body in a protruding manner; and the insertion slot adapts to the insertion portion, allowing the first cover body to be detachably assembled with the second cover body.

In one of the embodiments, the lamp holder includes: a lamp holder body, provided with a mounting chamber, a positive electrode conductive plate and a negative electrode conductive plate being provided in the mounting chamber, and the lamp base being mounted in the mounting chamber and electrically connected to the positive electrode conductive plate and the negative electrode conductive plate; a power cord with a middle connected to the positive electrode conductive plate and the negative electrode conductive plate separately, an end of the power cord being provided with a connector; and a bottom cover, detachably assembled with the lamp holder body, the bottom cover being configured to block one end of the lamp holder body away from the light emitting unit and tightly pressing and fixing the power cord.

In one of the embodiments, the lamp holder body is further provided with fastening portions and fastening holes, and the bottom cover includes: a blocking portion, connected to the lamp holder body; an accommodating portion, connected to an end face of the blocking portion on a side away from the light emitting unit; fastening heads, extending into the fastening holes to be connected to the fastening portions so as to enable the bottom cover to be fixedly connected to the lamp holder body; and an abutting portion, abutted against the power cord, where after the fastening heads are connected to the fastening portions, the abutting portion abuts against the power cord so as to fix the power cord on the lamp holder body.

In one of the embodiments, the lamp holder body is provided with a bayonet, and the power cord is accommodated inside the bayonet; the abutting portion is provided with a radially extending groove, and the power cord is accommodated within the groove; and the bayonet is matched with the groove to limit the power cord.

In one of the embodiments, a first tip is provided on a side of the positive electrode conductive plate close to the power cord, and a second tip is provided on a side of the negative electrode conductive plate close to the power cord; and both the first tip and the second tip are configured to be inserted into the power cord to realize an electrical connection between the power cord and the positive electrode conductive plate and an electrical connection between the power cord and the negative electrode conductive plate.

After adopting the above technical solutions, the present disclosure has the beneficial effects that: due to the detachable assembly between the decorative covers and the lamp shades, on the one hand, the different decorative covers can be replaced according to different usage scenarios, which not only enhances the application diversity of the decorative light string, but can also improve the applicability of the decorative light string, making the light string suitable for more scenes. On the other hand, directly assembling the decorative covers onto the lamp shades can reduce the area of the decorative covers located on non-luminous sides of the light emitting units, which allows the light generated by the electrified light emitting units to illuminate the decorative covers located within a larger area, thereby enabling more parts of the decorative covers to be displayed after being illuminated, and further enhancing the decorative effect of the decorative covers, so that the decorative effect of the decorative light string is improved.

BRIEF DESCRIPTION OF FIGURES

In order to provide a clearer explanation of the embodiments of the present disclosure or the technical solutions in the prior art, a brief introduction will be given below to the accompanying drawings required for describing the embodiments or the prior art. Apparently, the accompanying drawings in the following description are only some embodiments of the present disclosure, and those of ordinary skill in the art may further obtain other drawings based on these accompanying drawings without creative efforts.

Figure 1:
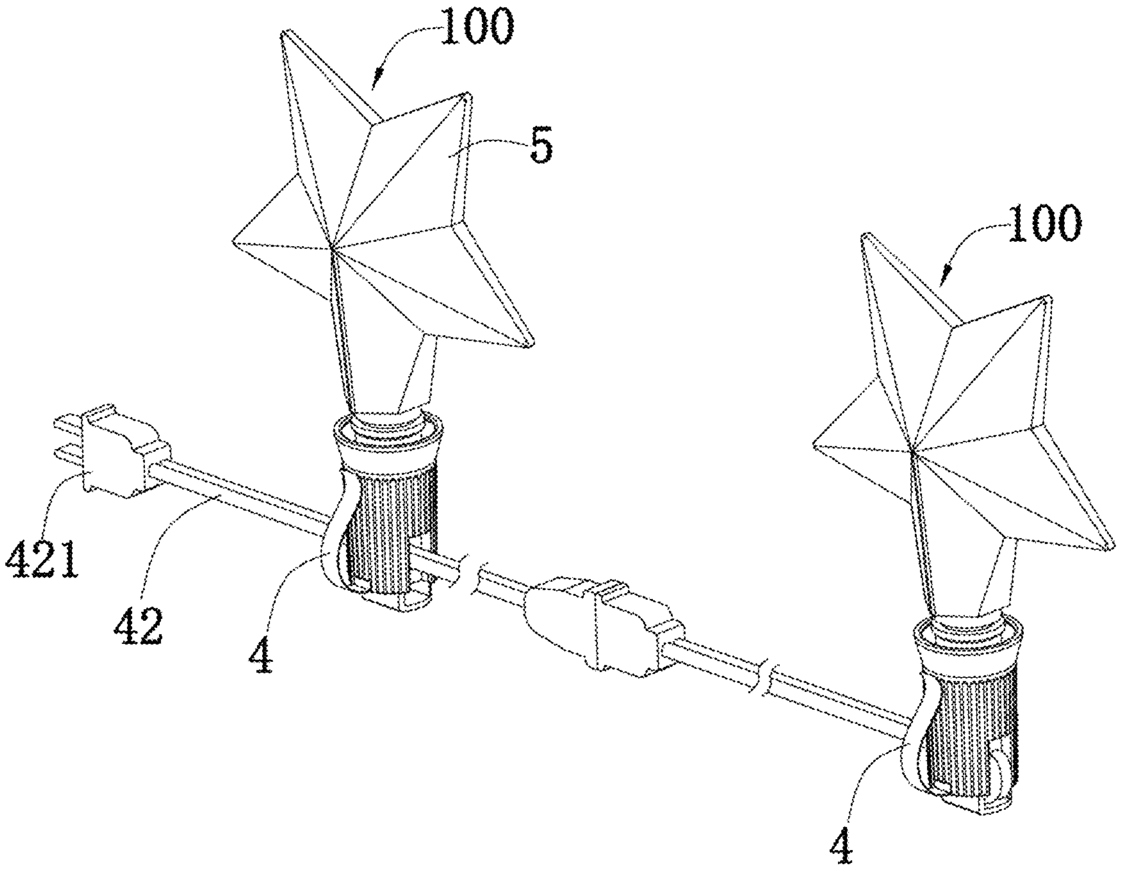
FIG. 1 is a schematic diagram of the overall structure of a light string in an embodiment of the present disclosure.

Description of reference numerals: 100 denotes decorative lights; 1 denotes a lamp base; 11 denotes a mounting groove; 2 denotes a light emitting unit; 3 denotes a lamp shade; 31 denotes a clamping portion; 32 denotes an assembly portion; 321 denotes an external threaded structure; 33 denotes a limit bulge; 4 denotes lamp holders; 41 denotes a lamp holder body; 410 denotes a mounting chamber; 411 denotes a positive electrode conductive plate; 4111 denotes a first tip; 412 denotes a negative electrode conductive plate; 4121 denotes a second tip; 413 denotes a mounting table; 414 denotes fastening portions; 415 denotes fastening holes; 416 denotes a limiting portion; 417 denotes a positioning groove; 418 denotes a bayonet; 42 denotes a power cord; 421 denotes a connector; 43 denotes a bottom cover; 431 denotes a blocking portion; 4311 denotes a positioning block; 432 denotes an accommodating portion; 4321 denotes an accommodating groove; 433 denotes fastening heads; 434 denotes an abutting portion; 4341 denotes a groove; 435 denotes a hook portion; 5 denotes decorative covers; 50 denotes an accommodating cavity; 501 denotes a clamping slot; 51 denotes a first cover body; 511 denotes an insertion portion; 52 denotes a second cover body; and 521 denotes an insertion slot.

DETAILED DESCRIPTION

The following clearly and completely describes the technical solutions in the embodiments of the present disclosure with reference to the accompanying drawings in the embodiments of the present disclosure. Apparently, the described embodiments are merely some but not all of the embodiments of the present disclosure. All other embodiments obtained by those of ordinary skill in the art based on the embodiments in the present disclosure without creative efforts shall fall within the protection scope of the present disclosure.

In the description of the present disclosure, it should be noted that the orientation or position relationships indicated by the terms “center”, “up”, “down”, “left”, “right”, “front”, “back”, “vertical”, “horizontal”, “inside”, and “outside” are based on the orientation or position relationships illustrated in the drawings, only for the convenience of describing the present disclosure and simplifying the description, instead of indicating or implying that the device or component referred to should have a specific orientation, or be configured and operated in a specific orientation, so they should not be understood as limitations to the present disclosure. In addition, the terms “first”, “second” and “third” are used for the purpose of description only and should not be understood to indicate or imply relative importance.

In the description of this application, it should be noted that unless otherwise explicitly specified or defined, the terms such as “mount”, “connect”, and “connection” should be understood in a broad sense. For example, the connection may be a fixed connection, a detachable connection, or an integral connection; or the connection may be a mechanical connection or an electrical connection; or the connection may be a direct connection, an indirect connection through an intermediary, or internal communication between two components. Those of ordinary skill in the art could understand the specific meanings of the above terms in the present disclosure according to specific situations.

This embodiment relates to a light string with replaceable decorative covers, which is mainly used in parks, squares, residential areas, streets, courtyards, and other places. Corresponding lamp shade shapes can be changed according to different holiday scenes. For example, the Christmas tree lamp shade is changed for Christmas, the skull lamp shade is changed for Halloween, the pumpkin lamp shade is changed for Halloween, and the lantern lamp shade is changed for New Year's Eve.

It should be noted that, referring to FIG. 1, in this embodiment, the decorative light string includes multiple decorative lights 100, and the multiple decorative lights 100 can be used in combination in a splicing manner, so that a user can freely splice the decorative lights 100 for use according to the number as required, thereby improving the application diversity and universality of the decorative light string. A single decorative light 100 located at an end of the light string will be described below as an example.

Figure 2:
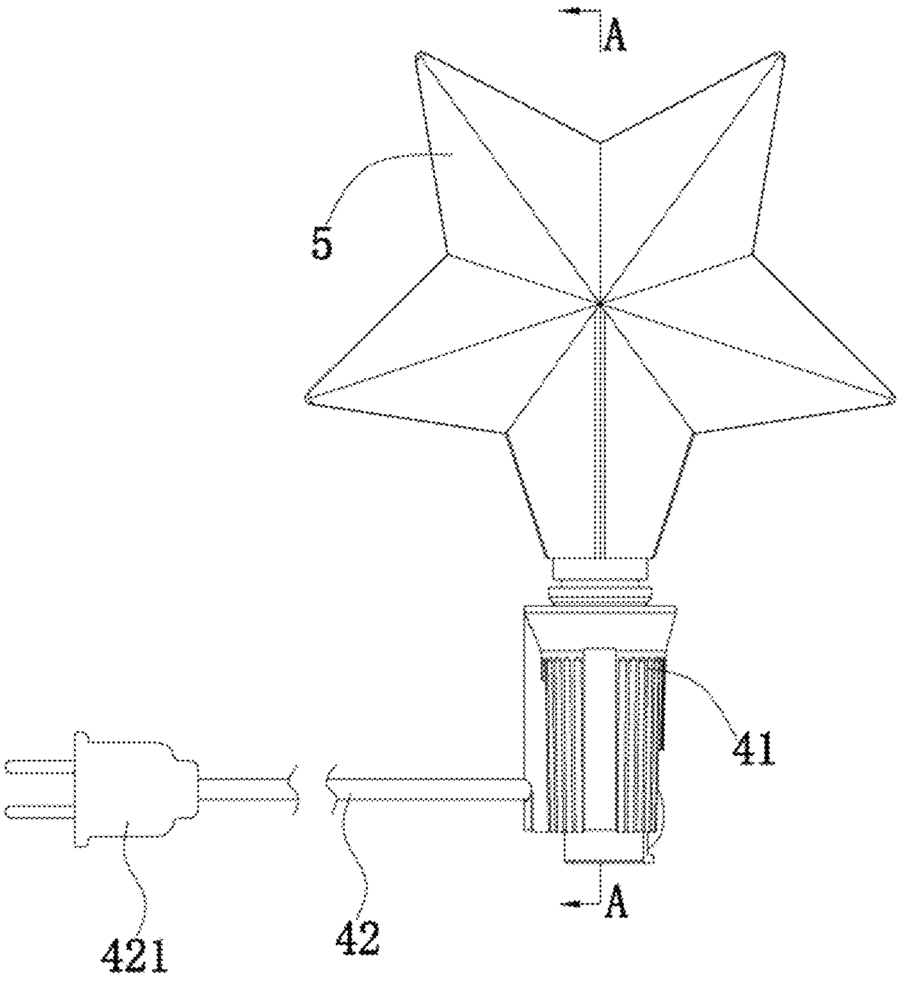
FIG. 2 is a front view of a decorative light in an embodiment of the present disclosure.
Figure 4:
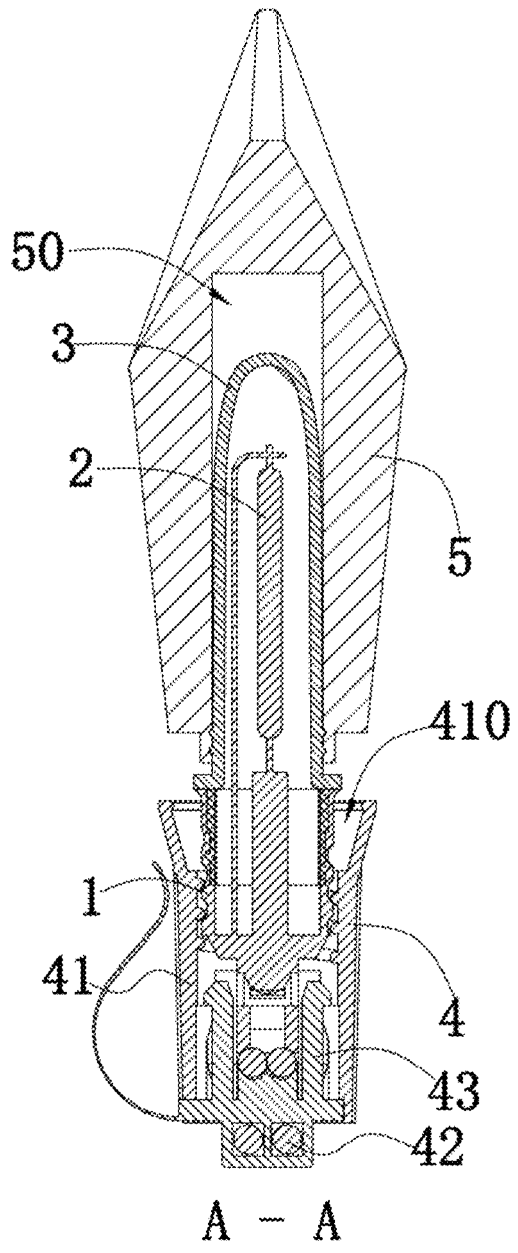
FIG. 4 is a cross-sectional view taken along a cutting line A-A in FIG. 2.
Figure 5:
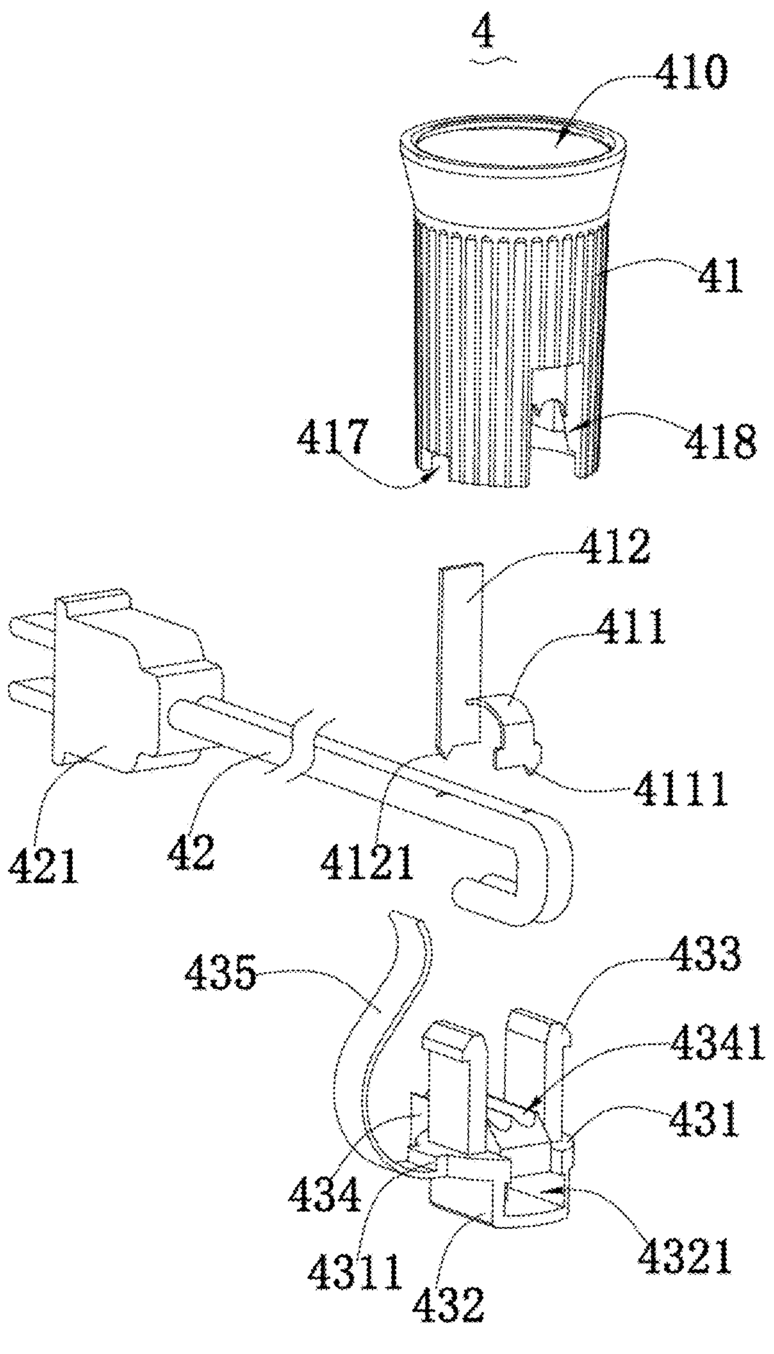
FIG. 5 is an exploded view of a lamp holder in an embodiment of the present disclosure.
Figure 6:
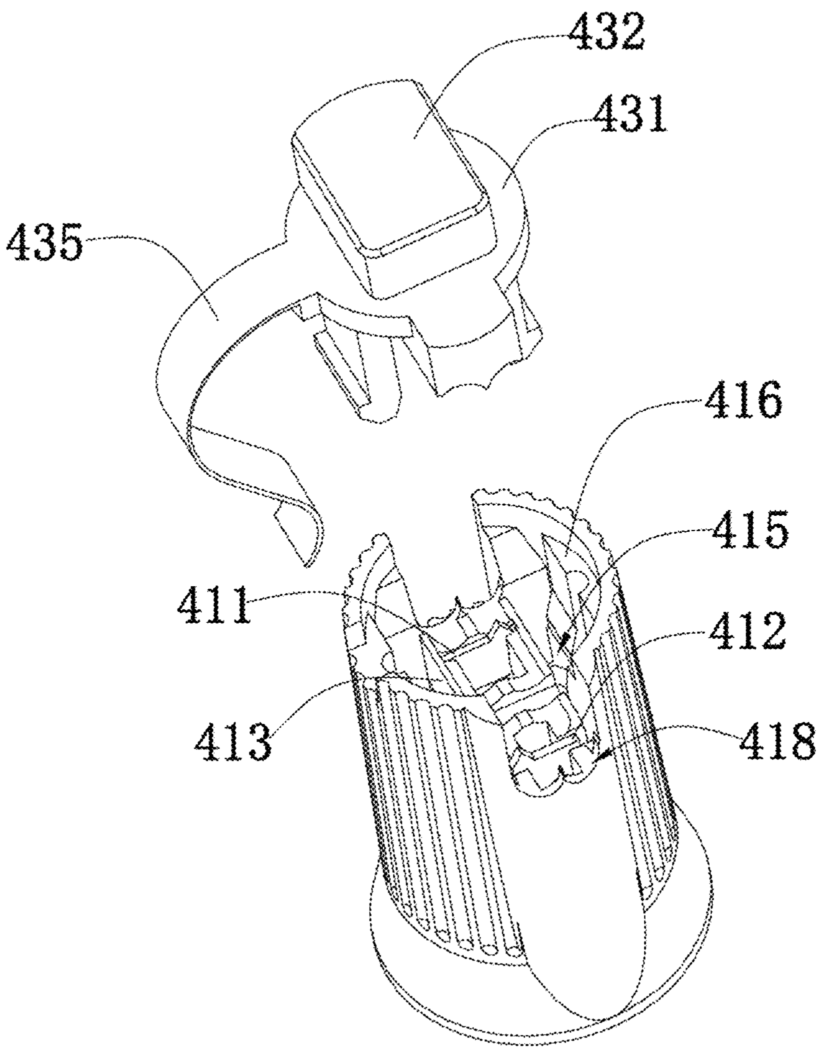
FIG. 6 is a schematic structural diagram of a lamp holder body and a bottom cover in an embodiment of the present disclosure.
Figure 7:
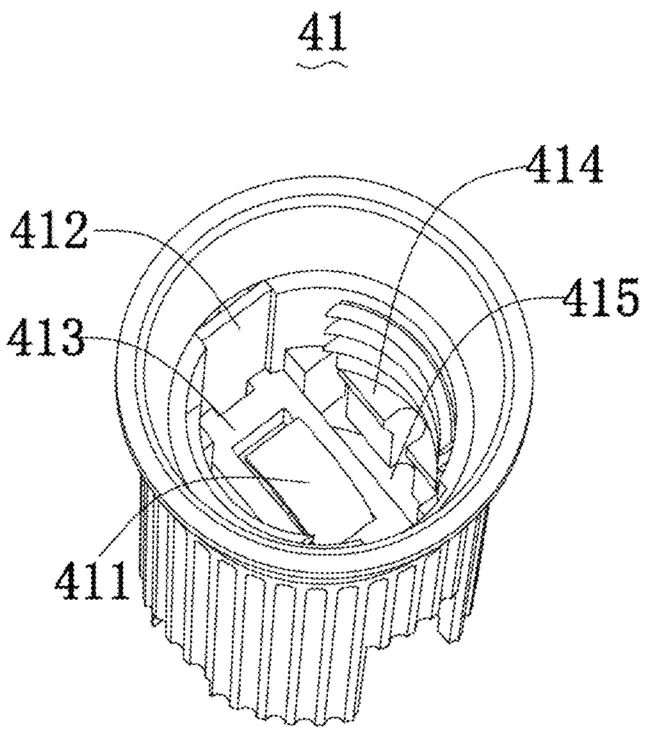
FIG. 7 is a schematic structural diagram of a lamp holder body in an embodiment of the present disclosure.

Please refer to FIG. 2 and FIG. 4. In one of the embodiments, the decorative light 100 includes: a lamp base 1, a light emitting unit 2, a lamp shade 3, a lamp holder 4 and a decorative cover 5.

Specifically, the light emitting unit 2 is connected to the lamp base 1, and the light emitting unit 2 is configured to emit light when powered on, so as to illuminate the decorative cover 5 through the lamp shade 3. The lamp shade 3 is connected to the lamp base 1 and covers the light emitting unit 2 to protect the light emitting unit 2. The lamp holder 4 is detachably assembled with an end of the lamp base 1 away from the light emitting unit 2. Due to arrangement of the lamp holder 4, adjacent decorative lights 100 can be spliced, and an electrical connection between the decorative light string and an external power supply can be also realized, so that all the decorative lights 100 are supplied with power. The decorative cover 5 is detachably assembled with the lamp shade 3 to realize quick replacement of the decorative cover 5. The decorative cover 5 has an accommodating cavity 50. After the decorative cover 5 is assembled with the lamp shade 3, the lamp shade 3 is accommodated inside the accommodating cavity 50.

It should be noted that due to the detachable assembly between the decorative cover 5 and the lamp shade 3, on the one hand, different decorative covers 5 can be replaced according to different usage scenarios, which not only enhances the application diversity of the decorative light string, but can also improve the applicability of the decorative light string, making the light string suitable for more scenes. On the other hand, directly assembling the decorative cover 5 onto the lamp shade 3 can reduce the area of the decorative cover 5 located on a non-luminous side of the light emitting unit 2, which allows the light generated by the electrified light emitting unit 2 to illuminate the decorative cover 5 located within a larger area, thereby enabling more parts of the decorative cover 5 to be displayed after being illuminated, and further enhancing the decorative effect of the decorative cover 5, so that the decorative effect of the decorative light string is improved.

In this embodiment, an outer side wall of the lamp base 1 is provided with external threads, and the lamp holder 4 is provided with internal threads. The detachable assembly between the lamp base 1 and the lamp holder 4 is achieved through screw-thread fit, that is, the lamp base 1 is a regular screw-socket light bulb, and the lamp holder 4 is a screw-socket lamp holder adapted to the screw-socket light bulb. A conductive contact is provided at an end of the lamp base 1 away from the light emitting unit 2, and a side wall of the lamp base 1 is made of a conductive material. After assembly of the lamp base 1 and the lamp holder 4, the lamp base 1 and the lamp holder 4 are electrically connected. In other embodiments, the lamp base 1 and the lamp holder 4 may also be assembled in a manner of rotary clamping, plug-in, or the like, as long as a detachable connection between the lamp base 1 and the lamp holder 4 can be achieved, and a circuit can switched on after the connection.

Figure 8:
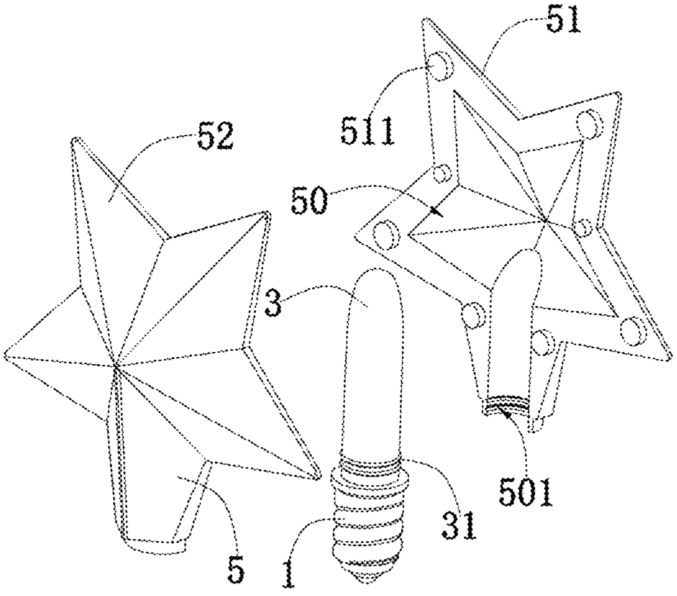
FIG. 8 is a schematic structural diagram of a decorative cover, a lamp shade and a lamp base in an embodiment of the present disclosure.
Figure 9:
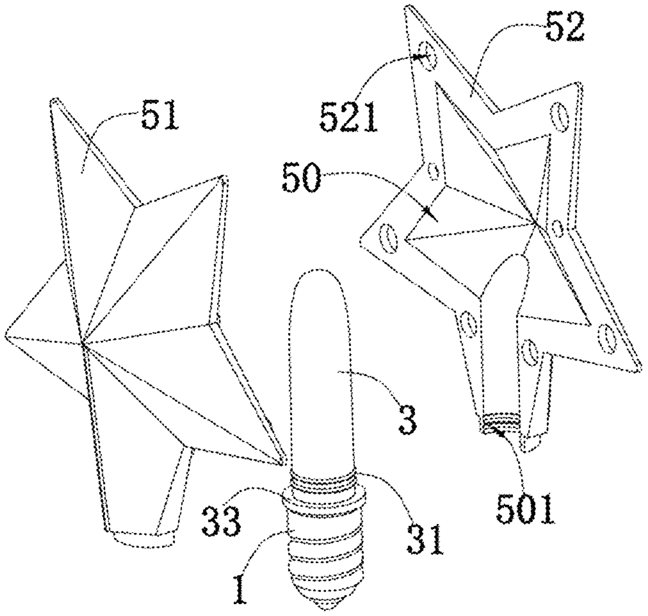
FIG. 9 is a schematic structural diagram of a decorative cover, a lamp shade and a lamp base in another embodiment of the present disclosure.

Please refer to FIG. 8 and FIG. 9. In one of the embodiments, a clamping portion 31 is provided on an outer side wall of the lamp shade 3 in a protruding manner. A clamping slot 501 is formed in an inner wall of the accommodating cavity 50 on a side close to the clamping portion 31. The clamping portion 31 adapts to the clamping slot 501, allowing the lamp shade 3 to be detachably assembled with the decorative cover 5. In this way, the assembly and disassembly between the lamp shade 3 and the lamp holder 5 is very simple through the snap fit between the clamping slot 501 and the clamping portion 31, which facilitates quick replacement of the decorative cover 5 by a user, and further improves the practicality of the decorative light string.

In one of the embodiments, a clamping portion 31 may also be provided on a side wall of the accommodating cavity 50 in a protruding manner. A clamping slot 501 is then formed in an outer side wall of the lamp shade 3. Alternatively, both the clamping portion 31 and the clamping slot 501 are provided on the outer side wall of the lamp shade 3; and correspondingly, both the clamping slot 501 and the clamping portion 301 are provided on the inner side wall of the accommodating cavity 50 in the same way. The arrangement of the clamping portion 31 and the clamping slot 501 only needs to meet the requirement of enabling the lamp shade 3 and the decorative cover 5 to be detachably assembled.

Please return to FIG. 2 to FIG. 4. In one of the embodiments, an interstice is reserved between the clamping portion 31 and the lamp base 1, so that the decorative cover 5 and the lamp base 1 are spaced apart. The decorative cover 5 provided in this way can be enabled to be located entirely on a luminous side of the light emitting unit 2, which makes the decorative cover 5 fully illuminated when the light emitting unit 2 is powered on to emit light, and further improves the decorative effect of the decorative cover 5. Therefore, the overall decorative effect of the decorative light string is improved.

In one of the embodiments, a mounting groove 11 is formed on a side of the lamp base 1 close to the lamp shade 3, and an assembly portion 32 is provided on a side of the lamp shade 3 close to the lamp base 1. The detachable assembly between the lamp base 1 and the lamp shade 3 is achieved by the cooperation of the assembly portion 32 and the mounting groove 11.

In one of the embodiments, a limit bulge 33 is provided in a protruding manner at a position where the assembly portion 32 is connected to the lamp shade 3. In the process of assembling the lamp shade 3 and the lamp base 1, a length of the lamp shade 3 entering the mounting groove 11 can be limited by abutting the limit bulge 33 against an end face of the lamp base 1 on a side close to the decorative cover 5. In this embodiment, limit bulge 33 is an annular structure provided on the outer side wall of the lamp shade 3 in a protruding manner. In other embodiments, the limit bulge 33 may be composed of multiple arc-shaped structures provided on the outer side wall of the lamp shade 3 in a protruding manner.

In one of the embodiments, an interstice d is reserved between the limit bulge 33 and the clamping portion 31, so that the decorative cover 5 and the lamp base 1 are spaced apart. The lamp shade 3 provided in this way can further make the decorative cover 5 completely located at the luminous side of the light emitting unit 2 and thus make the decorative cover 5 fully illuminated when the light emitting unit 2 is powered on to emit light, so that the decorative effect of the decorative cover 5 is further improved, and the overall decorative effect of the decorative light string is improved.

Figure 3:
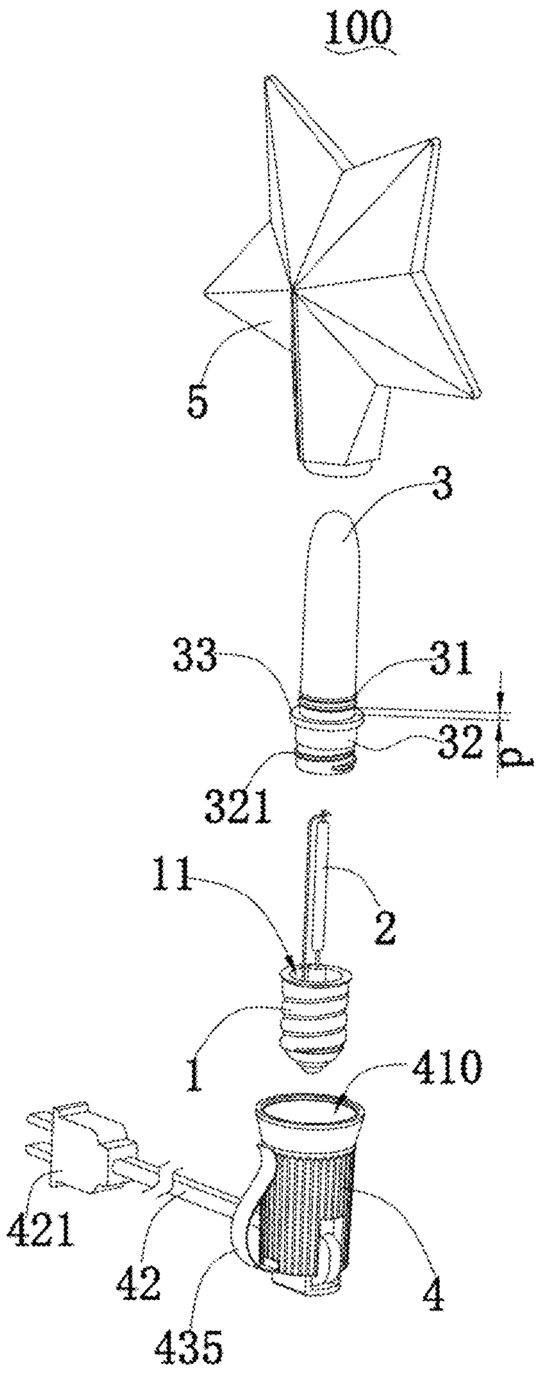
FIG. 3 is an exploded view of a decorative light in an embodiment of the present disclosure.

Please continue to refer to FIG. 2 to FIG. 4. In one of the embodiments, an external threaded structure 321 is provided on an outer side wall of the assembly portion 32 in a protruding manner, and correspondingly, an internal threaded structure (not shown in the figures) adapted to the external threaded structure 321 is provided on an inner side wall of the mounting groove 11.

It should be noted that, when the lamp shade 3 is assembled with the lamp base 1, the assembly portion 32 is first inserted into the mounting groove 11; then, by rotating the lamp shade 3, the external threaded structure 321 is adapted to the internal threaded structure provided in the mounting groove 11 until the limit bulge 33 is abutted against an end face of the lamp base 1; and finally, the lamp base 1 and the lamp shade 3 are fixed by punching. In this way, the lamp base 1 and the lamp shade 3 can be kept relatively stable when being punched and fixed, so that the assembly stability of the lamp shade 3 and the lamp base 1 is improved.

Please refer to FIG. 2, FIG. 3, and FIG. 5 to FIG. 7. In one of the embodiments, the lamp holder 4 includes: a lamp holder body 41, a power cord 42 and a bottom cover 43. Specifically, the lamp holder body 41 has a mounting chamber 410, and a positive electrode conductive plate 411 and a negative electrode conductive plate 412 are provided in the mounting chamber 410. The lamp base 1 is connected to a side of the mounting chamber 410 away from the bottom cover 43, and is electrically connected to the positive electrode conductive plate 411 and the negative electrode conductive plate 412. A middle of the power cord 42 is connected to the positive electrode conductive plate 411 and the negative electrode conductive plate 412 separately. An end of the power cord 42 is provided with a connector 421, and the connector 421 is configured to realize the interconnection of adjacent lamp holder bodies 41, and can be connected to an external power supply to supply power to the decorative light string. The bottom cover 43 is detachably assembled with the lamp holder body 41, and is configured to block one end of the mounting chamber 410 of the lamp holder body 41. When the bottom cover 43 is connected to the lamp holder body 41, the power cord 42 can also be pressed and fixed.

In one of the embodiments, a mounting table 413 is provided on a side of the mounting chamber 410 close to the bottom cover 43, and the mounting table 413 is connected to an inner wall of the mounting chamber 410. An assembly groove (not shown in the figures) is formed in a middle of the mounting table 413, and the positive electrode conductive plate 411 is installed in the assembly groove. One end of the positive electrode conductive plate 411 is connected to the power cord 42, and the other end thereof is connected to an end face of the lamp base 1 on a side close to the bottom cover 43. A slot (not shown in the figures) extending along an axial direction of the lamp holder body 41 is formed in a side wall of the mounting chamber 410, and the negative electrode conductive plate 412 is inserted into the slot and connected to the lamp holder body 41. One end of the negative electrode conductive plate 412 is connected to the power cord 42, and the other end thereof is connected to a side wall of the lamp base 1.

It should be noted that, in this embodiment, the connectors 421 are power plugs and power sockets that can be adapted to each other. When multiple decorative lights are spliced and combined to form a decorative light string, due to arrangement of the connectors 421, the decorative light 100 is connected to the power socket of another adjacent decorative light 100 through the power plug, and so on, so that the decorative lights are spliced to form the decorative light string. The decorative light string provided in this way can formed by splicing the decorative lights according to the required length of the light string, and thus is simple and convenient to use. Still it should be noted that, for the decorative light 100 located at the tail of the decorative light string, only one end of the power cord 42 is provided with the connector 421, and the other end thereof is accommodated in the bottom cover 43, so as to prevent the end of the power cord 42 from being exposed. In other embodiments, the connectors 421 may also be USB plugs and USB sockets that can be adapted to each other. In other words, the connectors 421 only need to meet the requirements of connection and conductivity.

Please refer to FIG. 2, FIG. 3, and FIG. 5 to FIG. 7. In one of the embodiments, a first tip 4111 is provided on a side of the positive electrode conductive plate 411 close to the power cord 42, and a second tip 4121 is provided on a side of the negative electrode conductive plate 412 close to the power cord 42. When the bottom cover 43 is fastened to the lamp holder body 41, the bottom cover 43 presses the power cord 42 towards a side where the light emitting unit 2 is located, which causes the first tip 4111 and the second tip 4121 to respectively pierce into different sub wires inside the power cord 42, and allows same to be connected to conductive portions of the sub wires, thus achieving an electrical connection between the power cord 42 and the positive electrode conductive plate 411 and an electrical connection between the power cord 42 and the negative electrode conductive plate 412, and further achieving an electrical connection between the light emitting unit 2 and the power cord 42. In this way, the convenience of installation between the power cord 42 and the lamp holder body 41 can be greatly improved, which is conducive to the production and assembly of the decorative light 100.

In one of the embodiments, the lamp holder body 41 is further provided with fastening portions 414 and fastening holes 415. Furthermore, the fastening portions 414 are located on the sides of the fastening holes 415 away from the bottom cover 43. A part of the bottom cover 43 is provided with the fastening holes 415 in a penetrating manner and is fastened with the fastening portions 414, so that a detachable connection between the bottom cover 43 and the lamp holder body 41 is achieved.

In one of the embodiments, the bottom cover 43 includes: a blocking portion 431, an accommodating portion 432, fastening heads 433, and an abutting portion 434. Specifically, the blocking portion 431 is connected to a side of the lamp holder body 41 away from the light emitting unit 2 to block one end of the mounting chamber 410. The accommodating portion 432 is connected to an end face of the blocking portion 431 on a side away from the light emitting unit 2, and the accommodating portion 432 is configured to accommodate an end of the power cord 42 on the tail decorative light 100, so as to prevent the end of the power cord 42 from being exposed, and guarantee the service safety and overall aesthetics of the decorative light string. The fastening heads 433 are provided with the fastening holes 415 in a penetrating manner and are abutted against the fastening portions 414 to detachably fix the bottom cover 43 and the lamp holder body 41. The abutting portion 434 is provided on a side of the blocking portion 431 close to the light emitting unit 2. After the fastening heads 433 are connected to the fastening portions 414, the power cord 42 is fastened to the lamp holder body 41 by way of the abutting portion 434.

It should be noted that, in this embodiment, the accommodating portion 432 is provided with an accommodating groove 4321, and the end of the power cord 42 of the tail decorative light 100 is accommodated inside the accommodating groove 4321, so that the overall aesthetics of the lamp holder 4 is guaranteed, the end exposure of the power cord 42 is avoided, and the service safety of the decorative light string is ensured.

In one of the embodiments, a limiting portion 416 is provided on a side of the lamp holder body 41 close to the bottom cover 43. When the fastening heads 433 are fit with the fastening portions 414, the blocking portion 431 is abutted against the limiting portion 416. On the one hand, it can prevent the blocking portion 431 from being completely mounted into the mounting chamber 410, and make an end face of the blocking portion 431 on a side away from the light emitting unit 2 flush with an end face of the lamp holder body 41 on a side away from the light emitting unit 2, thus further improving the aesthetics of the overall assembly of the lamp holder 4. On the other hand, it can make the fastening heads 433 and the fastening portions 414 fastened tightly, thus preventing the fastening heads 433 from extending too long and losing the fastening effect.

It should also be noted that two fastening heads 433 are provided, and correspondingly, two fastening holes 415 and two fastening portions 414 are available. Moreover, in this embodiment, fixed ends of the fastening heads 433 are connected to the blocking portion 431, and free ends thereof extend towards a side where the light emitting unit 2 is located. The free ends of the two fastening heads 433 slightly expand outward towards the opposite sides, so that the free ends of the fastening head 433 can be quickly fastened to the fastening portions 414 after extending out of the fastening holes 415, thereby improving the firmness of installation.

Please continue to refer to FIG. 2, FIG. 3, and FIG. 5 to FIG. 7. In one of the embodiments, a positioning block 4311 is provided on the blocking portion 431, and a positioning groove 417 is formed in the lamp holder body 41. When the lamp holder body 41 is assembled with the bottom cover 43, the positioning block 4311 is fitted with the positioning groove 417, so that the rapid disassembly and assembly of the lamp holder body 41 and the bottom cover 43 is facilitated, and the convenience of disassembly and assembly is improved.

In one of the embodiments, the abutting portion 434 is located between the two fastening heads 433, and a radially extending groove 4341 is provided on a side of the abutting portion 434 away from the blocking portion 431. The lamp holder body 41 is provided with a bayonet 418, and the power cord 42 is snapped into the bayonet 418. After the bottom cover 43 is assembled with the lamp holder body 41, the groove 4341 is fitted with the bayonet 418 so as to limit the power cord 42.

It should be noted that both ends of the abutting portion 434 protrude out from a side wall of the blocking portion 431. After the bottom cover 43 is assembled with the lamp holder body 41, both ends of the abutting portion 434 are basically flush with an outer side wall of the lamp holder body 41, so that the tightness and aesthetics of the combination between the bottom cover 43 and the lamp holder body 41 are guaranteed.

In one of the embodiments, the bottom cover 43 further includes a hook portion 435. One end of the hook portion 435 is connected to the positioning block 4311, and the other end thereof extends toward a side where decorative cover 5 is located. The hooking portion 435 is located at an outer side of the lamp holder body 41, and when the hook portion is used for hooking, an external object is located between the hooking portion 435 and the outer side wall of the lamp holder body 41. In this embodiment, the hook portion 435 is integrally formed with the bottom cover 43.

Please refer to FIG. 8 to FIG. 11. In one of the embodiments, the decorative cover 5 is integrally formed. A notch of the accommodating cavity 50 is provided on an end face of the decorative cover 5 on a side close to the lamp holder 4.

In one of the embodiments, the decorative cover 5 includes a first cover body 51 and a second cover body 52, and the first cover body 51 and the second cover body 52 are detachably assembled. The accommodating cavity 50 is defined by the first cover body 51 and the second cover body 52.

Figure 10:
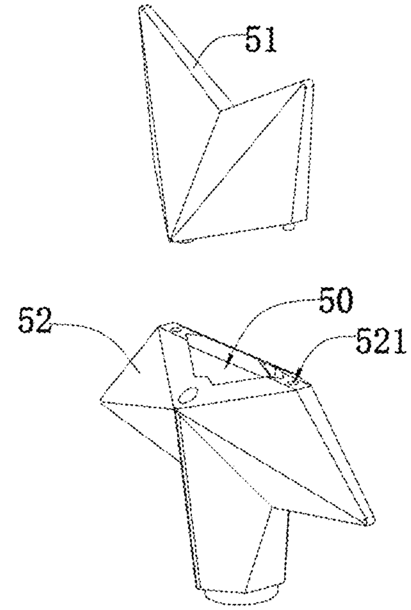
FIG. 10 is a schematic structural diagram of a decorative cover in an embodiment of the present disclosure.
Figure 11:
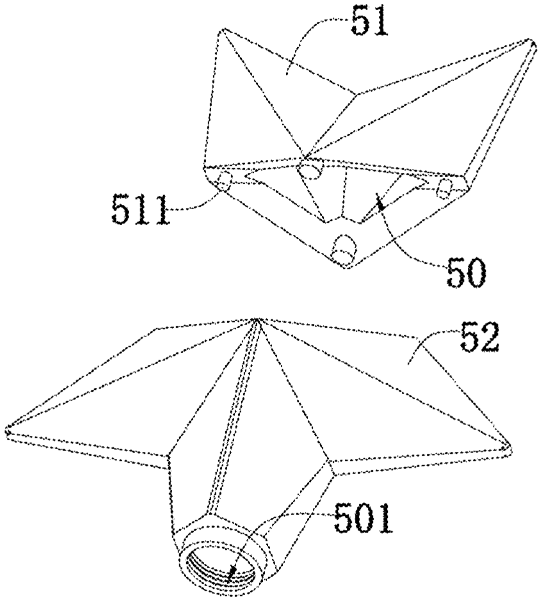
FIG. 11 is a schematic structural diagram of a decorative cover in another embodiment of the present disclosure.

It should be noted that, as shown in FIG. 8 and FIG. 9, the first cover body 51 and the second cover body 52 may be front and rear mounted cover bodies, or upper and lower mounted cover bodies as shown in FIG. 10 and FIG. 11, or left and right mounted cover bodies, as long as the detachable assembly between the first cover body 51 and the second cover body 52 can be implemented.

In one of the embodiments, an insertion portion 511 is provided on the first cover body 51 in a protruding manner. An insertion slot 521 is formed in an end face of the second cover body 52 on a side close to the first cover body 51. The first cover body 51 and the second cover body 52 are assembled in a detachable manner through the insertion fit between the insertion portion 511 and the insertion slot 521. The decorative cover 5 provided in this way is not only easy to disassemble and assemble, but also can reduce the difficulty of production and manufacturing, thereby reducing the manufacturing cost.

In another embodiment, an insertion portion 511 may be provided on the second cover body 52, and correspondingly, an insertion slot 521 is formed in the first cover body 51. Alternatively, each of the first cover body 51 and the second cover body 52 is provided with the insertion portion 511 and the insertion slot 521, which are provided corresponding to each other. That is to say, as long as the detachable assembly of the first cover body 51 and the second cover body 52 is achieved through the insertion portion(s) 511 and the insertion slot(s) 521, during manufacturing, the positions and quantities of the insertion slot(s) 521 and the insertion portion(s) 511 can be set according to demand.

In other embodiments, the first cover body 51 and the second cover body 52 may be detachably assembled by snap fit, or may be detachably assembled directly by fastening screws.

After adopting the above technical solutions, due to the detachable assembly between the decorative cover 5 and the lamp shade 3, on the one hand, the different decorative covers 5 can be replaced according to different usage scenarios, which not only enhances the application diversity of the decorative light string, but can also improve the applicability of the decorative light string, making the light string suitable for more scenes. On the other hand, directly assembling the decorative cover 5 onto the lamp shade 3 can reduce the area of the decorative cover 5 located on the non-luminous side of the light emitting unit 2, which allows the light generated by the electrified light emitting unit 2 to illuminate the decorative cover 5 located within a larger area, thereby enabling more part of the decorative cover 5 to be displayed after being illuminated, and further enhancing the decorative effect of the decorative cover 5, so that the decorative effect of the decorative light string is improved.

The foregoing descriptions are merely used to illustrate the technical solutions of the present disclosure, and are not intended to limit the present disclosure. Any other modifications or equivalent replacements made by those of ordinary skill in the art to the technical solutions of the present disclosure shall be covered by the scope of the claims of the present disclosure as long as they do not depart from the spirit and scope of the technical solutions of the present disclosure.

What is claimed is:

1. A light string with replaceable decorative covers, comprising a plurality of spliceable decorative lights, wherein each of the decorative lights comprises: a lamp base;

a light emitting unit, connected to the lamp base, the light emitting unit being configured to emit light when powered on;

a lamp shade, connected to the lamp base, the lamp shade covering the light emitting unit;

a lamp holder, assembled with the lamp base, the lamp holder being configured to connect the decorative lights and achieve a connection with an external power supply;

a decorative cover, detachably assembled with the lamp shade, the decorative cover having an accommodating cavity, and the lamp shade being accommodated inside the accommodating cavity;

wherein a clamping portion is provided on an outer side wall of each of the lamp shades in a protruding manner, and a clamping slot is formed in an inner wall of the corresponding accommodating cavity on a side close to the clamping portion; and/or, a clamping slot is formed in an outer side wall of each of the lamp shades, and a clamping portion is provided on an inner wall of the corresponding accommodating cavity on a side close to the clamping slot in a protruding manner;

the clamping slots adapt to the clamping portions, allowing the lamp shades to be detachably assembled with the decorative covers; and wherein the clamping portions are provided on the outer side walls of the lamp shades, the clamping slots are formed in the inner walls of the accommodating cavities, and an interstice is reserved between each of the clamping portions and the corresponding lamp base, so that each of the decorative covers and the corresponding lamp base are spaced apart.

2. The light string with replaceable decorative covers according to claim 1, wherein a mounting groove is formed on a side of each of the lamp bases close to the corresponding lamp shade, an assembly portion is provided on a side of the lamp shade close to the lamp base, and the assembly portion is inserted into the mounting groove and connected to the lamp base; a limit bulge is provided in a protruding manner at a position where the assembly portion is connected to the lamp shade; and an interstice is reserved between the limit bulge and the clamping portion, so that the decorative cover and the lamp base are spaced apart after assembly.

* * * * *